Oct. 6, 1931.　　　G. W. VEALE　　　1,826,105
SPOTLIGHT SWITCH
Filed Sept. 14, 1929
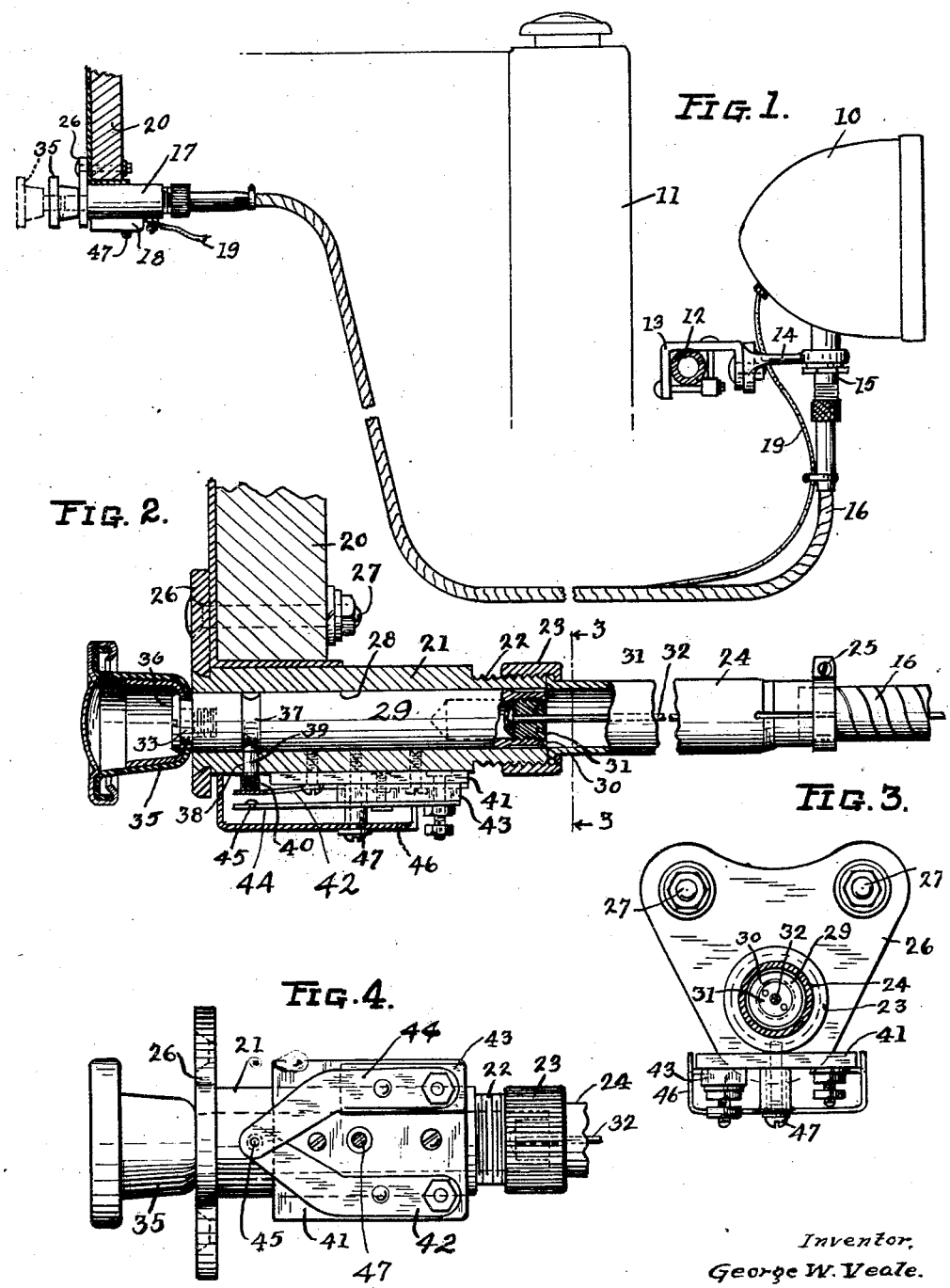
Inventor,
George W. Veale.
Kwis Hudson & Kent
Attorneys.

Patented Oct. 6, 1931

1,826,105

UNITED STATES PATENT OFFICE

GEORGE W. VEALE, OF CLEVELAND HEIGHTS, OHIO, ASSIGNOR TO THE EATON AXLE & SPRING COMPANY, OF CLEVELAND, OHIO, A CORPORATION OF OHIO

SPOTLIGHT SWITCH

Application filed September 14, 1929. Serial No. 392,562.

This invention relates to spotlight switches and more particularly to devices of this character adapted to open and close the light circuit for dirigible spotlights, having means under the control of the operator for directing the light.

It is an object of the invention to combine the light switch with the direction control means.

Another object of the invention is to close the light switch by the initial operation of the direction control means, and to open the switch by final operation of the direction control means.

A further object of the invention is to operate the light switch by lost motion of the direction control means.

Other objects and features of novelty will be apparent as the following description proceeds, as taken in connection with the accompanying drawings, in which:

Fig. 1 is a diagrammatic elevation of portions of an automobile, showing the general arrangement of the spotlight and the control means;

Fig. 2 is an enlarged vertical section through the control device;

Fig. 3 is a cross section taken along the line 3—3 of Fig. 2; and

Fig. 4 is a bottom plan view of the structure shown in Fig. 2, with the cover removed.

Referring more particularly to the drawings, a spotlight 10 is shown as mounted on an automobile in front of the radiator 11. The light is supported by a cross bar 12, such as is usually provided as a stay between the front fenders or front headlights of an automobile, but any other desired portion of the automobile may be utilized to support the light. A clamp 13 is secured to the bar 12 and carries a bracket 14, in which is secured the supporting stem 15 for the light 10. A flexible conduit 16 connects the stem 15 with a control device indicated generally at 17. Associated with the control device is an electric switch 18 connected by conductors 19 to the light bulb for the spotlight 10. The conductor 19 may be independent of the conduit 16, but for convenience these two members may be mounted together.

The control device 17 is mounted on a portion of the automobile body or frame, within reach of the occupant, preferably on the instrument board or dash 20 of the automobile. This control device comprises essentially a housing 21, one end of which is provided with a threaded boss 22 of reduced diameter, adapted to receive a coupling 23 which secures a tube 24 against the end of the boss 22. The tube 24 is connected to the conduit 16 and secured thereto by a collar 25.

The front end of the member 21 carries a flange 26 adapted to be mounted on the inside of the dash 20. Bolts 27 pass through the flange 26 and secure the control device to the dash.

The member 21 is provided with a bore 28 which slidably receives a plunger 29. The inner end of the plunger 29 is provided with a threaded bore 30 which receives a threaded plug 31. A steel wire 32 or other flexible connecting means, which operates within the conduit 16, is passed through a central aperture in the plug 31 and upset so that when the plug 31 is fitted into the bore 30, the member 32 is securely attached to the plunger 29.

The handle end of the plunger 29 is provided with a boss 33 of reduced diameter to receive the operating knob 35. The boss 33 is centrally bored and threaded to receive a screw 36, which secures the knob 35 to the plunger 29. The plunger 39 is provided with an annular groove 37, and the housing 21 is provided with a vertical bore 38 adapted to receive a vertically sliding pin 39. The lower end of the pin 39 has secured thereto an insulating cap 40.

Secured to the lower side of the member 21 is a block 41 of fiber or other insulating material and secured thereto is a switch member 42 of the form shown in Fig. 4. A second block 43 of insulating material is secured below the block 41 and carries a switch member 44 which is similar in shape to the member 42, but oppositely disposed. The members 42 and 44 are of resilient material. The member 42 normally engages the insulating cap 40 and urges the pin 39 to the position shown in Fig. 2. The member 44 carries a contact point 45 which, as shown in Fig. 4, is located in alignment with the pin 39. A cover 46 is secured to the member 21 by means of a screw 47.

The mounting for the spotlight 10 is such that rotation of the flexible member 32 will turn the light about a vertical axis, and reciprocation of the flexible member 32 will turn the light about a horizontal axis, but since the details of construction of the spotlight form no part of this invention, a description thereof has been omitted. The flexible member 32 has some lost motion in its operation due to the bore of the conduit 16 being much larger than the diameter of the wire and, therefore, a slight pull on the knob 35 may take place without moving the light. However, it should be noted that this slight pull on the knob 35 will move the plunger 29 so that the groove 37 will be moved out of alignment with the pin 39 and will thrust the pin 39 downward. This will cause the insulated cap 40 to urge the spring member 42 downward into engagement with the contact point 45. The spring members 42 and 44 are in circuit with the bulb and the source of energy for the spotlight so that, as soon as the member 42 engages the contact 45, the light will be turned on. Further movement of the plunger 29 will result in elevation of the light about its horizontal axis and, at the same time, by rotation of the knob 35, the light may be adjusted laterally without opening the switch. To turn off the light, the operator merely pushes in the knob 35, moving the plunger 29 into the position shown in Fig. 2, which will bring the groove 37 into position to receive the pin 39 and permit the switch member 42 to move away from the contact 45, thus opening the circuit and turning off the light.

While one embodiment of the invention has been shown and described in full detail for the purposes of adequate disclosure, the broad idea of the invention is not limited to any of the details disclosed, but includes such embodiments of the invention as fall within the scope of the appended claims.

Having thus described my invention, what I claim is:

1. In combination with an actuating member mounted for sliding and rotary movement, a torsion transmission element connected to said member, an electrical switch, means for closing said switch in response to the initial part of said sliding movement of said member and maintaining said switch closed during the remainder of said sliding movement or rotation of said member.

2. In combination with an actuating plunger, a housing, said plunger being mounted for sliding movement in said housing, switch members, a member movable through said housing for closing said switch members, and means associated with said plunger for actuating said member to close said switch members by sliding the plunger.

3. In combination with an actuating member, a housing, said member comprising a grooved plunger mounted for sliding movement in said housing, a pin mounted in said housing and movable into said groove, a spring switch member urging said pin into said groove, and a second switch member mounted in position to contact with said spring switch member when said pin is moved out of said groove.

4. In combination with an actuating member, a housing, said member comprising a plunger movable in said housing and having a recess, a spring switch member, a second switch member, and means normally urged into said recess by said spring switch member, said means being movable out of said recess by movement of said plunger to cause said spring switch member to contact with said second switch member.

5. A device of the character described comprising in combination, a housing, an actuating plunger slidable in said housing, a spring switch member, a second switch member, and means extending through said housing and actuated by sliding movement of said plunger for urging said spring switch member into contact with said second switch member.

6. A device of the character described, a housing, an actuating member slidable in said housing, a normally open spring switch carried by said housing, a groove in said slidable member, a pin engaging said groove when said switch is open, and adapted to close said switch when said slidable member is moved.

7. A device of the character described comprising in combination, a housing, an actuating plunger having a cam surface, a follower for said cam surface extending through said housing, a spring switch member biased to urge said follower against said cam surface, and a second switch member positioned to be engaged by said spring switch member upon movement of said follower.

8. A device of the character described comprising in combination, an actuating member mounted for sliding movement, a lost motion device associated with said member whereby initial movement of said member takes up said lost motion, and further movement of said member causes effective movement of said device, and means for closing said switch in response to said initial movement.

9. In combination with an actuating member mounted for sliding and rotary movement, an electrical switch, cam means for closing said switch in response to sliding movement of said member and permitting rotation of said member without disturbing said switch.

10. In combination with an actuating member mounted for sliding and rotary movement, an electrical switch, means for closing said switch in response to the initial part of the sliding movement of said member and maintaining said switch closed during the remainder of said sliding movement of said member, said means permitting rotation of said member without disturbing said switch.

In testimony whereof, I hereunto affix my signature.

GEORGE W. VEALE.